UNITED STATES PATENT OFFICE.

FREDERICK C. ATKINSON, OF INDIANAPOLIS, INDIANA.

IMPREGNATED CHARCOAL.

1,361,131.     Specification of Letters Patent.     Patented Dec. 7, 1920.

No Drawing.     Application filed August 8, 1919. Serial No. 316,252.

*To all whom it may concerns*

Be it known that I, FREDERICK C. ATKINSON, a citizen of the United States, residing at Indianapolis, in the county of Marion and State of Indiana, have invented certain new and useful Improvements in Impregnated Charcoal, of which the following is a specification.

This invention relates to impregnated charcoal, and more especially to a method of producing charcoal particularly adapted for use in case hardening compositions and containing so-called "energizers." These energizers consist usually of the basic metals, such as barium and sodium in various combinations, but preferably as the carbonate.

Hitherto such impregnated charcoal was formed by adding to the charcoal already prepared, barium carbonate or mixtures of barium and sodium carbonates by dusting these compounds over the moistened charcoal or by spraying or sprinkling an aqueous suspension or solution of the carbonates or other salts over the dry charcoal. By such a process the insoluble barium salt, and to a large extent the soluble sodium carbonate, will be deposited more or less completely upon the surface only of the charcoal there being but very little penetration to the interior.

It is desirable that the energizer, as barium carbonate, or barium oxid, be equally distributed throughout the charred material within the pores of the same in order that the barium may be available to the material being treated as uniformly as the carbon itself is available, it being among the objects of this invention to produce a charcoal in which the barium will be substantially uniformly disseminated throughout the mass.

In carrying the objects of my invention into effect I impregnate the raw material from which such charcoal is to be made, such as wood chips, corn cobs, etc., with a solution of a soluble salt of an alkali or alkali earth metal, herein called alkali, or mixtures of the same, such as barium in which the acid radical is preferably organic, such as acetate. It is well known that salts of bases, such as barium, especially the organic salts, are easily converted into carbonate and oxids at comparatively low temperatures by destructive distillaton or by charring. By utilizing this phenomenon I convert the barium salt into carbonate or oxid or a mixture of carbonate and oxid during the carbonization of the raw material, the carbonate being the form of the base most desirable for use in case hardening.

When the materials, such as crushed corn cobs, wood shavings, wood chips or saw dust, and the like, are impregnated with a soluble salt of barium, or other suitable metal, the dissolved salt is carried into the cellular texture of the material and the material is then dried to evaporate the moisture from the dissolved salt leaving the salt substantially uniformly disseminated within the particles of raw material.

The dried material is then carbonized by any well known method in any suitable apparatus, such as is commonly used for charring wood, although I prefer distilling the said material in a closed retort. In the process of destructive distillation of this material or of charring the same, the salt as barium acetate is destroyed forming a considerable amount of acetone and leaving the barium distributed in the charcoal probably as the oxid, whereupon it immediately combines with carbon dioxid present, completely or partially, to form the carbonate, or a mixture of carbonate and oxid. It is probable that the barium salt acts as a catalyzer in the production of acetone from the acetate during a heating process, such as the above. By basic material is meant compounds which on heating leave residues, usually oxids, which are capable of combining with or neutralizing acids, such as carbonic.

Having thus fully described my said invention, what I claim as new and desire to secure by Letters Patent, is:

1. Charcoal having inorganic matter substantially uniformly disseminated therethrough.

2. Charcoal having basic inorganic material substantially uniformly disseminated therethrough.

3. Charcoal having alkaline salts substantially uniformly disseminated therethrough.

4. Charcoal having bairum carbonate substantially uniformly disseminated therethrough.

5. A process of preparing charcoal which consists in impregnating the raw material with a solution of inorganic matter and drying and carbonizing said material.

6. A process of preparing charcoal which consists in impregnating the raw material with a solution of basic matter and drying and carbonizing said material.

7. A process of preparing charcoal which consists in impregnating the raw material with alkaline compounds and drying and carbonizing said material.

8. A process of preparing charcoal which consists in impregnating the raw material with an alkaline salt and drying and carbonizing said material.

9. A process of preparing charcoal which consists in impregnating the raw material with an alkaline salt of an organic acid and drying and carbonizing said material.

10. A process of preparing charcoal which consists in impregnating the raw material with barium acetate and drying and carbonizing said material.

In witness whereof, I have hereunto set my hand and seal at New York city, New York this 5th day of August, A. D. nineteen hundred and nineteen.

FREDERICK C. ATKINSON. [L. S.]

Witnesses:
E NATTKEMPER,
CHRISTINA HARTMAYER.